2,947,755
SUBSTITUTED 1-m-AMINOPHENYL-2-PYRIDONES

John V. Scudi, Springfield, and David B. Reisner, Cedar Grove, N.J., Scott J. Childress, Broomall, Pa., and Lewis A. Walter, Madison, N.J., assignors to Wallace & Tiernan Incorporated, Belleville, N.J., a corporation of Delaware No Drawing. Filed Feb. 5, 1959, Ser. No. 791,249

3 Claims. (Cl. 260—296)

This invention relates to new and useful substituted m-aminophenyl-2-pyridones and mineral acid salts thereof, these amino compounds having the structural formula:

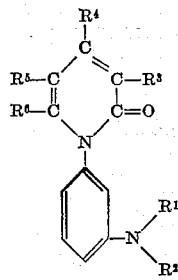

and the amino compounds being those which may be selected from the group consisting of: (a) the compounds in which $R^3$, $R^4$, $R^5$ and $R^6$ are substituents selected from the group consisting of hydrogen and lower alkyl groups, and (b) the compound in which $R^4$ is phenyl and in which the substituents $R^3$, $R^5$ and $R^6$ are each hydrogen; and wherein, in all said compounds of said groups (a) and (b) above, $R^1$ and $R^2$ are substituents selected from the group which consists of lower alkyl groups, lower alkanoic acid acyl and nitrogen; and the non-toxic mineral acid addition salts of the aforesaid amino compounds.

The compounds according to the present invention are useful as central nervous system depressants and are effective both orally and parenterally. More specifically, certain of these compounds are useful and effective as analgesics, some as anti-convulsants, and some as hypnotics.

The present application is a continuation-in-part of our prior and copending application Serial No. 676,418, filed August 5, 1957 and originally entitled "Substituted 1-Aminophenyl - 2 - Pyridones," which application is now abandoned.

In the preparation of many of the final compounds desired in accordance with the present invention, it is often found desirable first to prepare the nitro compounds corresponding respectively to the amino compounds finally desired according to this invention. There is shown in Table I which follows the characteristics of a number of such nitro products, which have been prepared according to the process of this invention as intermediates for use in preparing the respectively corresponding amino compounds. In ths table, the substituent listed under the heading ($R^{3-5}$) is a substituent at one of the positions $R^3$, $R^4$ and $R^5$ of the general formula above, the remainder of the substituents $R^3$, $R^4$, $R^5$ and $R^6$ each being hydrogen.

TABLE I
Substituted 1-(m-nitrophenyl)-2-pyridones

| Comp. No. | $R^{3-5}$ | M.P. (° C.) | Formula | Analysis for Nitrogen, Percent | |
|---|---|---|---|---|---|
| | | | | Calc'd | Found |
| 1 | 3-CH₃ | 137–139 | $C_{12}H_{10}O_3N_2$ | 12.17 | 12.35 |
| 2 | 4-CH₃ | 218–219.5 | $C_{12}H_{10}O_3N_2$ | 12.17 | 12.08 |
| 3 | 5-CH₃ | 168.5–169.5 | $C_{12}H_{10}O_3N_2$ | 12.17 | 12.08 |
| 4 | 3-C₂H₅ | 146–148 | $C_{13}H_{12}O_3N_2$ | 11.47 | 11.64 |
| 5 | 4-C₂H₅ | 140–142 | $C_{13}H_{12}O_3N_2$ | 11.47 | 11.54 |
| 6 | 5-C₂H₅ | 105–106 | $C_{13}H_{12}O_3N_2$ | 11.47 | 11.42 |
| 7 | 4-C₃H₇ | 85.5–87.5 | $C_{14}H_{14}O_3N_2$ | 10.85 | 11.04 |
| 8 | 4-iso C₃H₇ | 145–146 | $C_{14}H_{14}O_3N_2$ | 10.85 | 10.74 |
| 9 | 4-C₅H₁₁ | 73.5–74.5 | $C_{16}H_{18}O_3N_2$ | 9.78 | 9.83 |
| 10 | 4-C₆H₅ | 193.5–195.5 | $C_{17}H_{12}O_3N_2$ | 9.58 | 9.63 |
| 11 | H | 185–186.5 | $C_{11}H_8O_3N_2$ | 12.96 | 13.06 |

The nitro compounds of Table I may be prepared, for example, by the methods set out in Example 1 which follows.

EXAMPLE 1

Preparation of 5 - methyl - (m - nitrophenyl) - 2 - pyridone (compound 3 of Table I)

Method A—Starting with 5-methyl-2-pyridone.—A suspension of 14.7 g. of the potassium salt of 5-methyl-2-pyridone in 50 ml. of o-dichlorobenzene was treated with 25 g. of m-iodonitrobenzene and 1 g. of copper powder. The solution was stirred under reflux until a sample thereof no longer showed an alkaline reaction in water. The solvent was removed in vacuo and the residue taken up in chloroform and filtered. The filtrate was washed with dilute sodium hydroxide and concentrated to give 10 g. of 5-methyl-1-(m-nitrophenyl)-2-pyridone. This material, when recrystallized from isopropyl acetate, had a melting point of 168°–169.5° C.

Method B—Starting with 5-methyl-1-phenyl-2-pyridone.—A solution of 30 g. of 5-methyl-1-phenyl-2-pyridone in 90 ml. of concentrated sulfuric acid was treated with 15 g. of nitric acid in 10 ml. of sulfuric acid, while keeping the temperature below 5° C. The temperature was permitted to rise to about 25° C. after the addition of the nitric acid was complete. Thirty minutes later, the solution was poured onto 900 g. of ice and filtered. There resulted 31 g. of a mixture of 5-methyl-1-(p-nitrophenyl)-2-pyridone and 5-methyl-1-(m-nitrophenyl)-2-pyridone. Following the neutralization of the filtrate with ammonia, 5 g. of crude 5-methyl-1-(m-nitrophenyl)-2-pyridone precipitated. This product was purified by several recrystallizations from 3 N HCl, which yielded 2.5 g. of pure 5-methyl-1-(m-nitrophenyl)-2-pyridone, which had a melting point of 168.5°–169.5° C.

Of the nitro compounds set out in Table I above, compounds numbered 3 and 9 were prepared in accordance with method B above by nitrating the corresponding 1-phenyl compound; while the other compounds listed in Table I were prepared by method A above.

The nitro compounds, examples of which are given above in Table I and the method of preparation of which is outlined above in Example 1, may in substantially all instances and except as hereinafter set out then be suitably reduced to form the corresponding amino compounds. There follows in Table II data as to a number of amino compounds according to the present invention which have been so prepared and tested.

TABLE II

*Substituted 1-(m-aminophenyl)-2-pyridones*

| Comp. No. | $R^{3-5}$ | M.P. (° C.) | Formula | Analysis for Nitrogen, Percent | |
|---|---|---|---|---|---|
| | | | | Calc'd | Found |
| 12 | 3-$CH_3$ | 158.5–160.5 | $C_{12}H_{12}ON_2$ | 13.99 | 14.02 |
| 13 | 4-$CH_3$ | 214–215.5 | $C_{12}H_{12}ON_2$ | 13.99 | 14.17 |
| 14 | 5-$CH_3$ | 182–184 | $C_{12}H_{12}ON_2$ | 13.99 | 14.04 |
| 15 | 4,6-di $CH_3$ | 226–228 | $C_{13}H_{14}ON_2$ | 13.08 | 13.08 |
| 16 | 3-$C_2H_5$ | 109–111 | $C_{13}H_{14}ON_2$ | 13.08 | 12.92 |
| 17 | 4-$C_2H_5$ | 150–152 | $C_{13}H_{14}ON_2$ | 13.08 | 13.07 |
| 18 | 5-$C_2H_5$ | 171–173 | $C_{13}H_{14}ON_2$ | 13.08 | 13.10 |
| 19 | 4-$C_3H_7$ | 108–109 | $C_{14}H_{16}ON_2$ | 12.27 | 12.27 |
| 20 | 4-iso $C_3H_7$ | 174–175 | $C_{14}H_{16}ON_2$ | 12.27 | 12.20 |
| 21 | 4-$C_5H_{11}$ | 94–96 | $C_{16}H_{20}ON_2$ | 10.93 | 11.11 |
| 22 | 4-$C_6H_5$ | 191–193 | $C_{17}H_{14}ON_2$ | 10.68 | 10.64 |
| 23 | H | 182.5–184.5 | $C_{11}H_{10}ON_2$ | 15.05 | 14.83 |

The amino compounds of Table II may be prepared from the nitro compounds of Table I as set out in Examples 2 and 3, which follow.

EXAMPLE 2

*Preparation of 5-methyl-1-(m-aminophenyl)-2-pyridone (compound 14 of Table II)*

Method C—By catalytic reduction of the corresponding nitro compound.—Ten grams of 5-methyl-1-(m-nitrophenyl)-2-pyridone (compound 3 of Table I above) in 50 ml. of alcohol was shaken with hydrogen and 1 g. of 5% palladium-charcoal catalyst until the theoretical amount of hydrogen was consumed. The catalyst was separated by filtration and the filtrate concentrated to give 5-methyl-1-(m-aminophenyl)-2-pyridone. This material was recrystallized from alcohol, resulting in 5 g. of the desired product, which had a melting point of 182°–184° C.

Method D.—By zinc-HCl reduction of the corresponding nitro compound.—Three grams of zinc was slowly added to a hot solution of 3 g. of 5-methyl-1-(m-nitrophenyl)-2-pyridone in 50 ml. of 3 N HCl. The solution was cooled, made alkaline with ammonia, and then extracted with chloroform. The chloroform was separated and evaporated, giving 2 g. of 5-methyl-1-(m-aminophenyl)-2-pyridone.

Of the amino compounds of Table II, numbers 14 and 18 were prepared by method C above. All the other meta compounds listed in Table II, with the exception of number 15, were prepared by method D above. Compound 15 of Table II was prepared by the method set forth hereinafter in Example 3.

EXAMPLE 3

*Preparation of 4,6-dimethyl-1-(m-aminophenyl)-2-pyridone (compound 15 of Table II)*

This compound is made by a method which does not involve the preparation of the nitro compound as an intermediate product, but presents a different approach. In this synthesis, 6.7 grams of 4,6-dimethylcoumalin and 8 grams of N-acetyl-m-phenylenediamine were heated at 165°–170° C. for seventeen hours, cooled, and the product washed with ether. After recrystallization from acetone there was obtained 2.5 g. of 4,6-dimethyl-1-(m-acetamidophenyl)-2-pyridone, which had a melting point of 238°–239° C. This compound was tested as to its nitrogen content as follows: calculated from the formula $C_{15}H_{17}O_2N_2$, nitrogen 10.93%; found—nitrogen—11.15%. This compound was hydrolyzed by refluxing in 2 N hydrochloric acid for one and one-half hours, which afforded the desired compound, 4,6-dimethyl-1-(m-aminophenyl)-2-pyridone. This desired compound was recrystallized from acetone and found to melt at 226°–228° C. In analyzing it for nitrogen, the theoretical amount, calculated from the formula $C_{13}H_{15}ON_2$, was nitrogen—13.08%; found, nitrogen—13.08%.

In all of the compounds listed in Table II above the substituents $R^1$ and $R^2$ of the general formula were both hydrogen. In accordance with this general formula, however either or both of these substituents may be a lower alkyl group, lower acyl or hydrogen. Examples of compounds wherein $R^1$ and/or $R^2$ are substituents other than hydrogen are given in Table III which follows; the fourth column, headed (—R), in this table being a substituent in the pyridone ring at the designated point and the substituents in the pyridone ring not specifically referred to being hydrogen in each instance.

TABLE III

*Substituted 1-m-aminophenyl-2-pyridone*

| Comp. No. | $R^1$ | $R^2$ | —R | M.P. ° C. | Formula | Analysis, Nitrogen | |
|---|---|---|---|---|---|---|---|
| | | | | | | Cal'd | Found |
| 24 | $CH_3CO$ | H | 3-$CH_3$ | 192–193 / 206–208 | $C_{14}H_{14}O_2N_2$ | 11.55 | 11.50 |
| 25 | $CH_3$ | $CH_3$ | 3-$CH_3$ | 192–195 | $C_{14}H_{16}ON_2 \cdot HCl$ | 10.58 | 10.51 |
| 26 | $C_2H_5$ | $C_2H_5$ | 4-$CH_3$ | 197–198.5 | $C_{16}H_{20}ON_2 \cdot HCl$ | 9.57 | 9.57 |
| 27 | $CH_3$ | H | 5-$CH_3$ | 113–115 | $C_{13}H_{14}ON_2$ | 13.08 | 13.06 |
| 28 | $CH_3CO$ | H | 4,6-di $CH_3$ | 238–239 | $C_{15}H_{16}O_2N_2$ | 10.93 | 11.15 |

In examples which follow, ways of preparing the compounds of Table III are set out.

EXAMPLE 4

*Preparation of 5-methyl-1-(m-methylaminophenyl)-2-pyridone (compound 27 of Table III)*

In order to prepare this compound, it was necessary first to prepare 5-methyl-1-(m-benzenesulfonamidophenyl)-2-pyridone by reacting 5-methyl-1-(m-aminophenyl)-2-pyridone (compound 14 of Table II) with benzenesulfonyl chloride. This sulfonamide is a white, crystalline material having a melting point of 217°–219° C. Analyzing this compound for nitrogen, the theoretical amount of nitrogen calculated from the formula $C_{18}H_{16}O_3N_2S$ is 8.24%; nitrogen found, 8.16%. This sulfonamide in a sodium hydroxide solution was treated with a slight excess of methyl iodide, thereby producing 5-methyl-1-[m-(N-methylbenzenesulfonamido)phenyl]-2-pyridone, which crystallized from the solution and was found to melt at 142.5°–144.5° C. In analyzing the compound for nitrogen, the theoretical amount calculated from the formula $C_{19}H_{18}O_3N_2S$ was nitrogen—7.91%; found, nitrogen—7.94%. This compound was hydrolyzed by refluxing with 6 N HCl, to yield the desired compound, 5-methyl-1-(m-methylaminophenyl)-2-pyridone, which was recrystallized from benzene and found to melt at 113°–115° C. In analyzing this desired compound for nitrogen, the theoretical amount calculated from the formula $C_{13}H_{14}ON_2$ was, nitrogen—13.08%; found, nitrogen—13.06%. From the point of view of weight and yield, 7 g. of 5-methyl-1-(m-aminophenyl)-2-pyridone were used to provide a yield of the desired methylated compound aforesaid (compound 27 of Table III) of 3.6 g.

EXAMPLE 5

*Prepartion of 3-methyl-1-(m-acetamidophenyl)-2-pyridone (compound 24 of Table III)*

A mixture of 4.2 g. of the potassium salt of 3-methyl-2-pyridone, 6.5 g. of m-iodoacetanilide and 0.4 g. of copper powder in 20 ml. of dimethylformamide was heated at 100° for 2 hours, then at 140° for 2 hours, cooled and filtered. Upon chilling the filtrate there was obtained 2.1 g. of 3-methyl-1-(m-acetamidophenyl)-2-pyridone, M.P. 206–208°.

This compound was also prepared by heating 3 g. of 3-methyl-1-(m-aminophenyl)-2-pyridone with 6 g. of acetic anhydride for a few minutes. The product (1.9 g.) so obtained was recrystallized from isopropyl alcohol and found to melt at 192–193° C. This melting point was raised to 206–208° when the molten product was seeded with crystals from the penetration in the preceding paragraph. There was then no depression of melting point when the two preparations were mixed.

It is believed as a theoretical matter that the difference in melting points of this substance is due to the production of polymorphic forms of the same compound, the lower melting form converting into the higher melting form on crystal seeding as aforesaid.

EXAMPLE 6

*Preparation of 4-methyl-1-(m-diethylaminophenyl)-2-pyridone hydrochloride (compound 26 of Table III)*

For this purpose 4.8 g. of 4-methyl-1-(m-aminophenyl)-2-pyridone (compound 13 of Table II above), 4.1 g. of sodium bicarbonate, and 8.6 g. of ethyl iodide in 50 ml. of ethyl alcohol were heated under reflux for 10 hours. The solvent was removed in vacuo. Water was added to the residue, which was then extracted with chloroform. The chloroform was evaporated and the residue treated with 6 g. of acetic anhydride at 100° for five minutes. After cooling, the mixture was made alkaline with sodium hydroxide and again extracted with chloroform. After evaporating the chloroform, the residue was treated with 20 ml. of 1 N HCl and filtered. The filtrate was made basic and extracted with ether. The ether was dried and treated with alcoholic HCl to give 4.7 g. of 4-methyl-1-(m-diethylaminophenyl)-2-pyridone hydrochloride (compound 26 of Table III). Upon recrystallization from isopropyl alcohol-acetone, it was found to have a melting point of 197°–198.5° C.

Compound 25 of Table III above was made in the same way as herein stated for the preparation of compound 26 of Table III.

Throughout this application all temperatures stated should be understood to be in degrees centigrade.

In general, hydrochlorides of the several amino compounds may be prepared in a manner conventional to the preparation of compounds of organic hydrochlorides from the corresponding amino compounds, and may be used whenever the increased water solubility of the hydrochlorides is to be preferred with respect to the relatively less water solubility of the respectively corresponding amino compounds. Such hydrochlorides are, therefore, to be considered within the purview of the present invention as well as their respectively corresponding amino compounds.

The specific proportions given are intended to be illustrative and the terms used in describing and claiming the invention have been used in their descriptive sense and not as terms of limitation and it is intended that all equivalents of the terms used be included within the scope of the appended claims.

What is claimed is:

1. A m-amino compound of the group consisting of those having the formula:

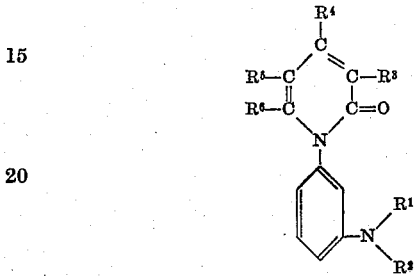

said compound being selected from the group consisting of: (a) the compounds in which $R^3$, $R^4$, $R^5$ and $R^6$ are substituents selected from the group consisting of hydrogen and lower alkyl groups, and (b) the compound in which $R^4$ is phenyl and in which the substituents $R^3$, $R^5$ and $R^6$ are each hydrogen; and wherein, in all said compounds of said groups (a) and (b) above, $R^1$ and $R^2$ are substituents selected from the group which consists of lower alkyl groups, lower alkanoic acid acyl and hydrogen; and the non-toxic mineral acid addition salts of the aforesaid amino compounds.

2. The compound, 1-(m-aminophenyl)-2-pyridone, having the formula:

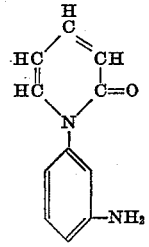

3. The compound, 5-methyl - 1 - (m-aminophenyl)-2-pyridone having the formula:

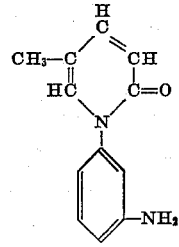

References Cited in the file of this patent

Vorlander: Ber. Deut. Chem., vol. 58, p. 1907 (1925).

UNITED STATES PATENT OFFICE

CERTIFICATE OF CORRECTION

Patent No. 2,947,755                                     August 2, 1960

John V. Scudi et al.

It is hereby certified that error appears in the printed specification of the above numbered patent requiring correction and that the said Letters Patent should read as corrected below.

Column 1, line 40, for "nitrogen" read -- hydrogen --; column 4, line 3, for "$165°-170°$ C." read -- $165°-175°$ C.--; columns 3 and 4, Table III, sixth column thereof, strike out the closing bracket which appears in the first line under the column headed "Formula" and insert the same after the figures "193 208" in the fifth column under the heading "M.P. °C."; column 5, line 21, for "penetration" read -- preparation --.

Signed and sealed this 31st day of January 1961.

(SEAL)
Attest:
KARL H. AXLINE
Attesting Officer

ROBERT C. WATSON
Commissioner of Patents